United States Patent

Iino et al.

[11] Patent Number: 5,526,494
[45] Date of Patent: Jun. 11, 1996

[54] BUS CONTROLLER

[75] Inventors: Hideyuki Iino; Hiromasa Takahashi, both of Kawasaki, Japan

[73] Assignee: Fujitsu Limited, Kawasaki, Japan

[21] Appl. No.: 859,470

[22] PCT Filed: Oct. 3, 1991

[86] PCT No.: PCT/JP91/01342

§ 371 Date: Jun. 2, 1992

§ 102(e) Date: Jun. 2, 1992

[87] PCT Pub. No.: WO92/06432

PCT Pub. Date: Apr. 16, 1992

[30] Foreign Application Priority Data

Oct. 3, 1990 [JP] Japan .................. 2-265482

[51] Int. Cl.[6] ........................... G06F 13/368
[52] U.S. Cl. .................. 395/299; 395/287; 395/730
[58] Field of Search ........................ 395/325, 725, 395/287, 288, 299, 305, 730

[56] References Cited

U.S. PATENT DOCUMENTS

| 4,908,749 | 3/1990 | Marshall et al. | 395/325 |
| 5,129,090 | 7/1992 | Bland et al. | 395/725 |
| 5,140,680 | 8/1992 | Best | 395/325 |
| 5,167,022 | 11/1992 | Bahr et al. | 395/325 |
| 5,237,696 | 8/1993 | Best | 395/325 |
| 5,301,282 | 4/1994 | Amini et al. | 395/325 |

FOREIGN PATENT DOCUMENTS

| 0343770 | 11/1989 | European Pat. Off. . | |
| 0426183 | 5/1991 | European Pat. Off. . | |
| 51-94730 | 8/1976 | Japan | G06F 9/06 |
| 62-154045 | 7/1987 | Japan | G06F 13/20 |

*Primary Examiner*—Jack B. Harvey
*Assistant Examiner*—Glenn A. Auve
*Attorney, Agent, or Firm*—Staas & Halsey

[57] ABSTRACT

A bus controller reduces the bus access wait time, to improve the performance of a processing unit that frequently accesses a main storage. The bus controller comprises a request signal generation unit for generating a bus right request signal according to a request from the processing unit, a bus right arbitration unit for arbitrating a bus right in response to the bus right request signal and importing the result of the arbitration, a bus access unit for accessing a bus through the processing unit serving as a bus master in response to a bus right acquisition acknowledgement, and a hold instruction unit for holding the request signal while a predetermined hold signal is being asserted and a predetermined release signal is being negated.

13 Claims, 11 Drawing Sheets

BUS CONTROLLER

TECHNICAL FIELD

This invention relates to a bus controller.

BACKGROUND ART

The operation speeds of microcomputer's semiconductor circuits, which includes processing units, a main storage, and an I/O interface have improved in recent years. These processing units are connected to one another through a bus. Bus access speed sometimes limits the performance of the processing units when the processing units frequently access the main storage and I/O interface through the bus.

Figure 1:
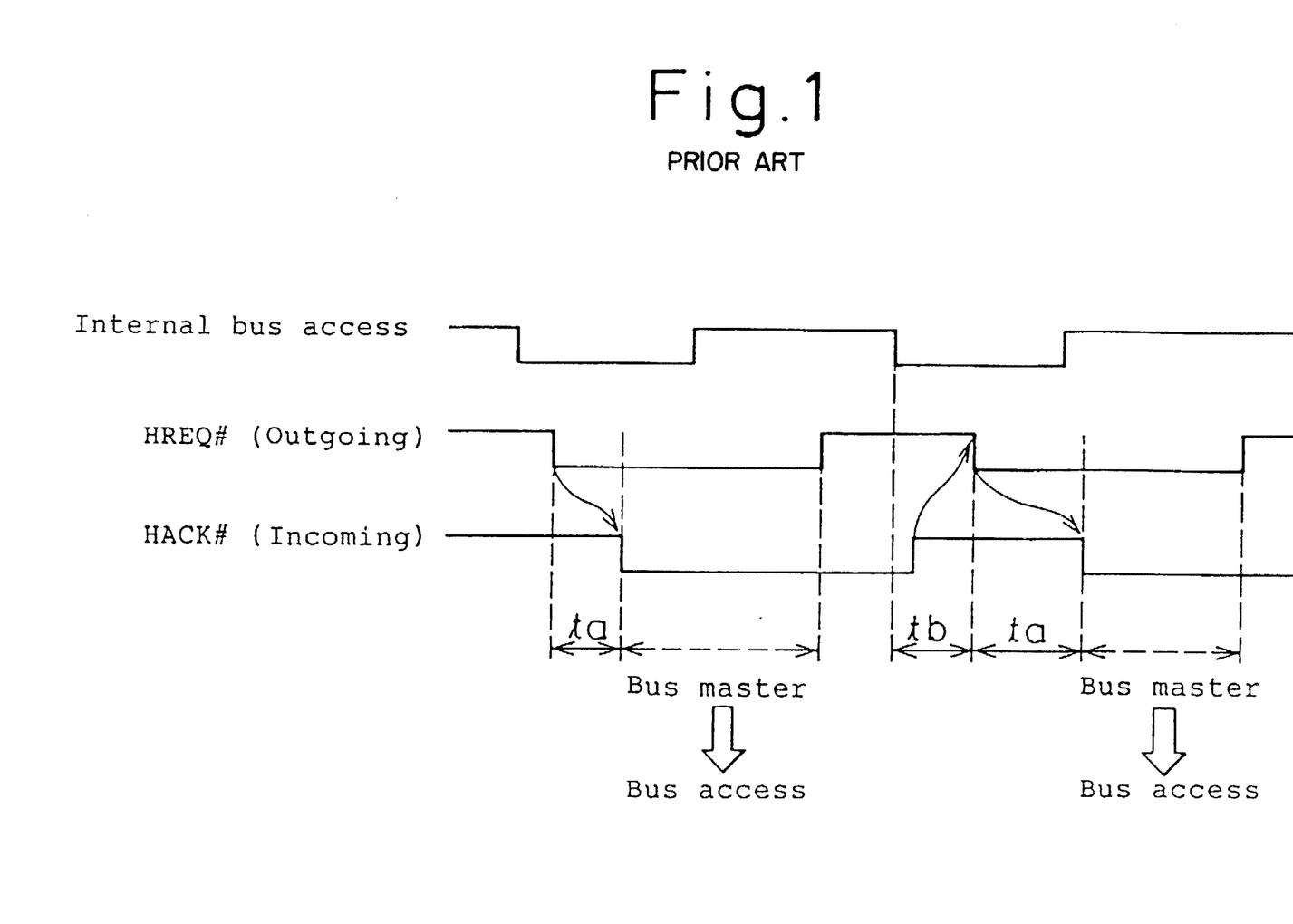
FIG. 1 is a timing chart showing an operation of a bus controller according to a prior art.

FIG. 1 is a timing chart showing a bus control system according to the prior art.

In the figure, one processing unit provides a data access request for accessing another processing unit that may be a main storage. An internal bus access signal is changed from a high logic to a low logic, and according to this change, an access request signal (HREQ#) is asserted. Here, the mark "#" indicates that the signal is active low.

The signal HREQ# is sent to, for example, an arbiter circuit that arbitrates a bus right. If the bus right is free, the arbiter circuit provides a bus right acquisition acknowledge signal (HACK#).

Upon receiving the signal HACK#, the processing unit becomes a bus master having the bus right to access the main storage to write and read data.

When the signal HREQ# is negated, the arbiter circuit recognizes this and negates the signal HACK# to release the bus right.

Transferring the two signals (HREQ# and HACK#) is called "bus arbitration."

This kind of conventional bus control system carries out the bus arbitration whenever a bus request is raised, so that, when the bus request is repeatedly issued, a bus access wait time is prolonged to deteriorate processing performance.

The bus access wait time is a time from asserting the signal HREQ# to receiving the asserted HACK# (a time ta in FIG. 1) and a time from providing a bus request to asserting the signal HREQ# (a time tb in FIG. 1).

A wait time Et accompanied by a single bus request is expressed as follows:

$$\Sigma t = ta$$

A wait time Σtn for n times of bus requests is expressed as follows:

$$\Sigma tn = (ta. \ n) + \{tb.(n-1)\}$$

Namely, as the number of bus requests increases, the wait time becomes longer. This may hinder the performance of a processing unit, i.e., a bus request source that frequently accesses the storage means.

Figure 2:
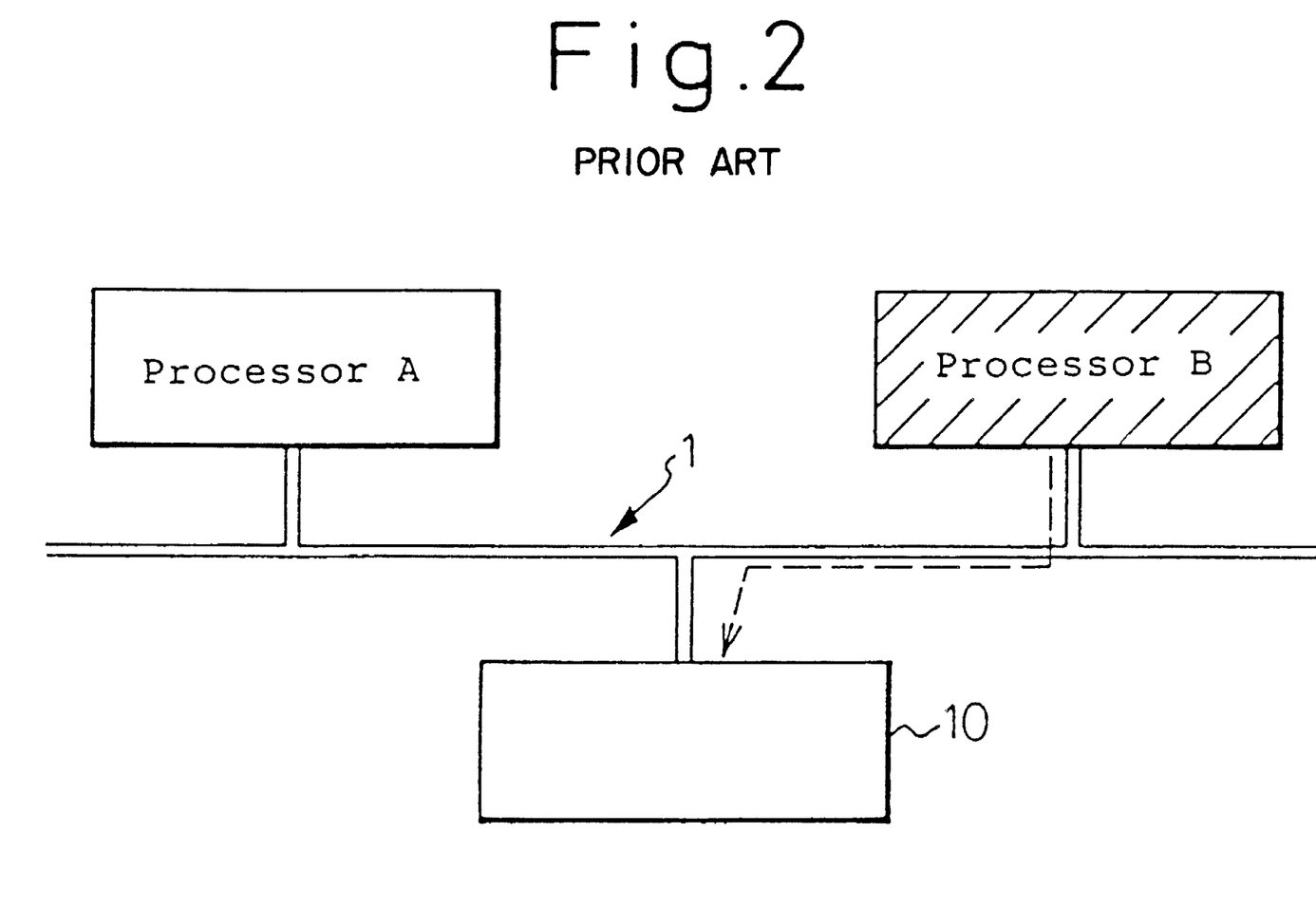
FIG. 2 is a schematic view showing a system employing the bus controller according to the prior art.

FIG. 2 shows two processing units (A and B) sharing a memory 10 through a common bus 1. When the processing unit B frequently accesses the memory, the efficiency of the system as a whole may deteriorate because the bus arbitration takes a long time.

An object of the invention is to reduce the bus access wait time and improve the performance of a processing unit, i.e., a bus request source that frequently accesses a storage means.

SUMMARY OF THE INVENTION

To achieve the object, the invention provides a bus controller used for a processing system having a plurality of processing units, a bus, and storage unit accessed by the processing units through the bus. At least some of the processing units have at least one of the bus controller forming unit such as a bus right request signal generation unit for providing a bus right request signal to another processing unit, bus access unit for accessing the bus after receiving a bus right acquisition acknowledgement, hold instruction units for generating a hold signal for holding the acquired bus right, bus right arbitration unit for arbitrating bus right request signals from the processing unit and notifying the processing unit of a result of the arbitration, and bus right release signal generation unit for generating a release signal to release the bus right acquired by the processing unit.

Based on this basic technical configuration, the bus controller comprises a request signal generation unit for generating a bus request signal in a given bus request source (one processing unit), bus right arbitration unit for arbitrating a bus right in response to the bus request signal and imparting the result of the arbitration bus access unit for accessing upon receiving a bus right acquisition acknowledgement; the bus with the bus request source (the processing unit) as a bus master hold instruction unit for providing an instruction to hold the request signal while a predetermined hold signal is being asserted and a predetermined release signal is being negated.

When the bus request source intermittently requests the bus right, it is preferable to assert the hold signal.

If another bus request source (another processing unit), which is different from the bus request source (processing unit) that is holding the bus right but shares the bus therewith, is going to request the bus right, the release signal will be asserted to release the bus held.

According to the invention, the bus right is continuously provided to the bus request source having the bus right if the hold signal is asserted and the release signal is negated.

As a result, only one time of the bus arbitration will do for a plurality of bus requests to shorten a wait time as follows:

$$\text{from } \Sigma tn=(ta. \ n)+\{tb.(n-1)\} \text{ to } \Sigma t =ta$$

When the bus request source holding the bus right is busy, i.e., intermittently requesting the bus right when the hold signal is asserted, the bus request source (processing circuit) will continuously be the bus master. This may shorten the processing time and improve the performance of the processing circuit.

If another bus request source (processing unit) that is different from the bus request source (processing unit) having the bus right but sharing the bus therewith does not request the bus right while the bus request source in question is holding the bus right, the release signal will be kept negated. As a result, the bus request source in question can be continuously the bus master to continuously hold the bus. When another bus request source is going to request the bus right during the bus holding state of the bus request source in question, the release signal is asserted to immediately release the bus right, and another bus request source acquires the bus right.

BRIEF DESCRIPTION OF THE DRAWINGS

FIGS. 4 through 8 are views showing a bus control system according to an embodiment of the invention, in which:

DETAILED DESCRIPTION OF THE PRESENT INVENTION

Bus controllers according to the invention will be explained in detail with reference to the drawings.

Figure 3A:
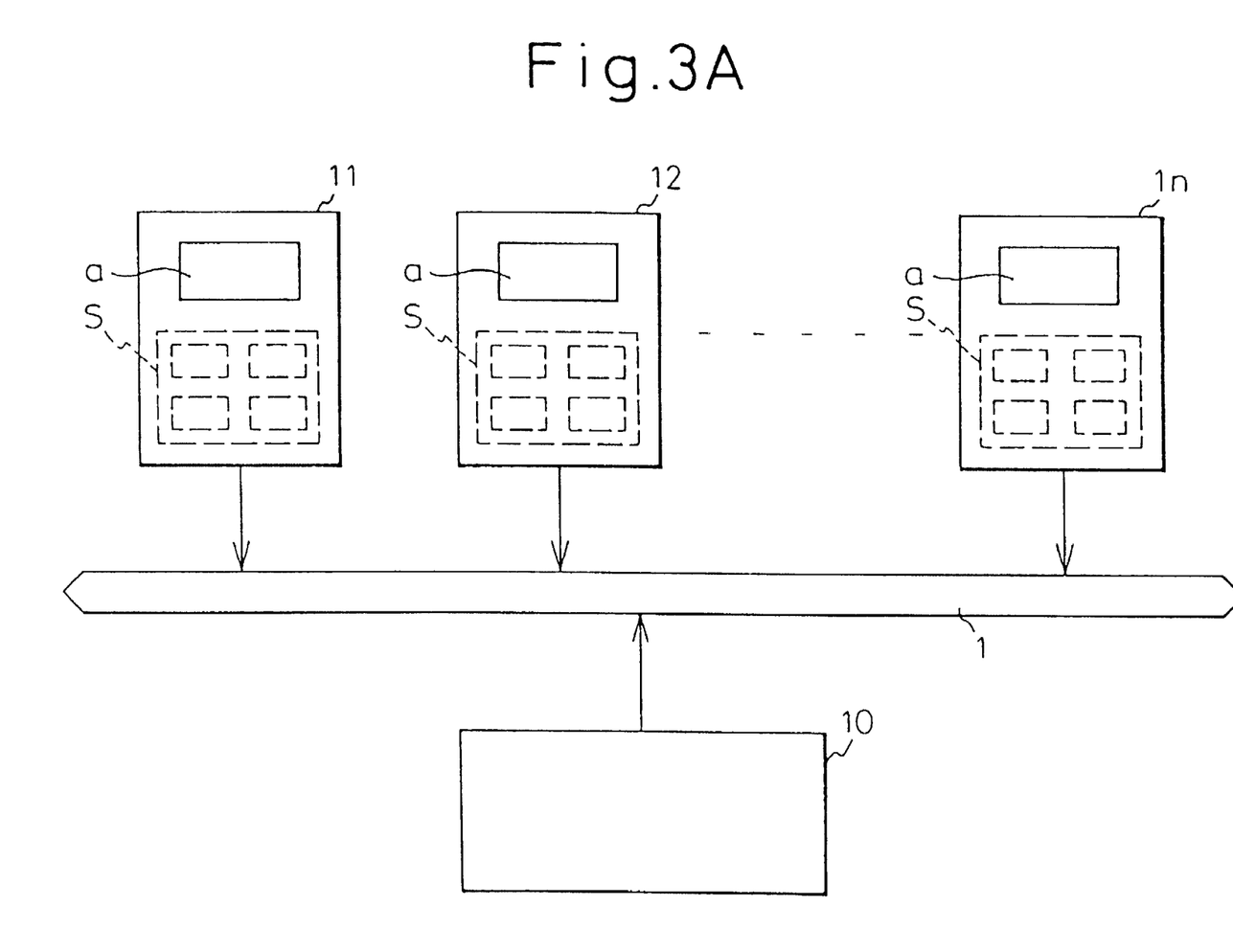
FIG. 3 is a view showing a principle of the invention.

FIG. 3A shows a principle of a bus controller according to the invention.

A processing system comprises a plurality of processing units (11, 12, 13, . . . , 1n), a bus 1, and storage unit 10 accessed by the processing unit through the bus. Each of the processing units (11 through 1n) includes a processor (a bus request source) (a) and a control unit S. The control unit S involves at least one of the below-mentioned units, which have different functions and selected as required.

Namely, the control unit S may include a bus right request signal generation units b for providing a bus right request signal (HREQ#) to other processing units (12, 13, . . . , 1n), bus access units (c) for accessing the bus upon receiving a bus right acquisition acknowledgement, hold instruction unit d for generating a hold signal (BHREQ#) for holding an acquired bus right, bus right arbitration unit (e) for arbitrating bus right request signals (HREQ#) from other processing units 12 to 1n and notifying them of a result of the arbitration, and bus right release signal generation unit (f) for generating a release signal (BRL#) for releasing the bus right acquired by the processing unit. The control units S (S11 through S1n) of the processing unit (11 through 1n) have at least one of the units (a) through (f) that are selected as required.

For example, the processing unit 11 of FIG. 3A may be main processing unit (cpu) in the processing system. In this case, this processing unit most frequently accesses the storage unit 10 through the bus, so that it is preferable that this processing unit has priority of accessing the storage unit over the other processing units (12 to 1n). For this purpose, the control unit S of the processing unit 11 may have the bus right arbitration unit (e) and the bus right release signal generation unit (f). The control units S of the other processing units (12 through 1n) may have the bus right request signal generation unit (b), bus access unit (c), and hold instruction unit (d). When the number of the processing units is small, the above arrangement is particularly effective because the processing units can directly exchange information between them, like exclusive-use circuits.

Figure 4:
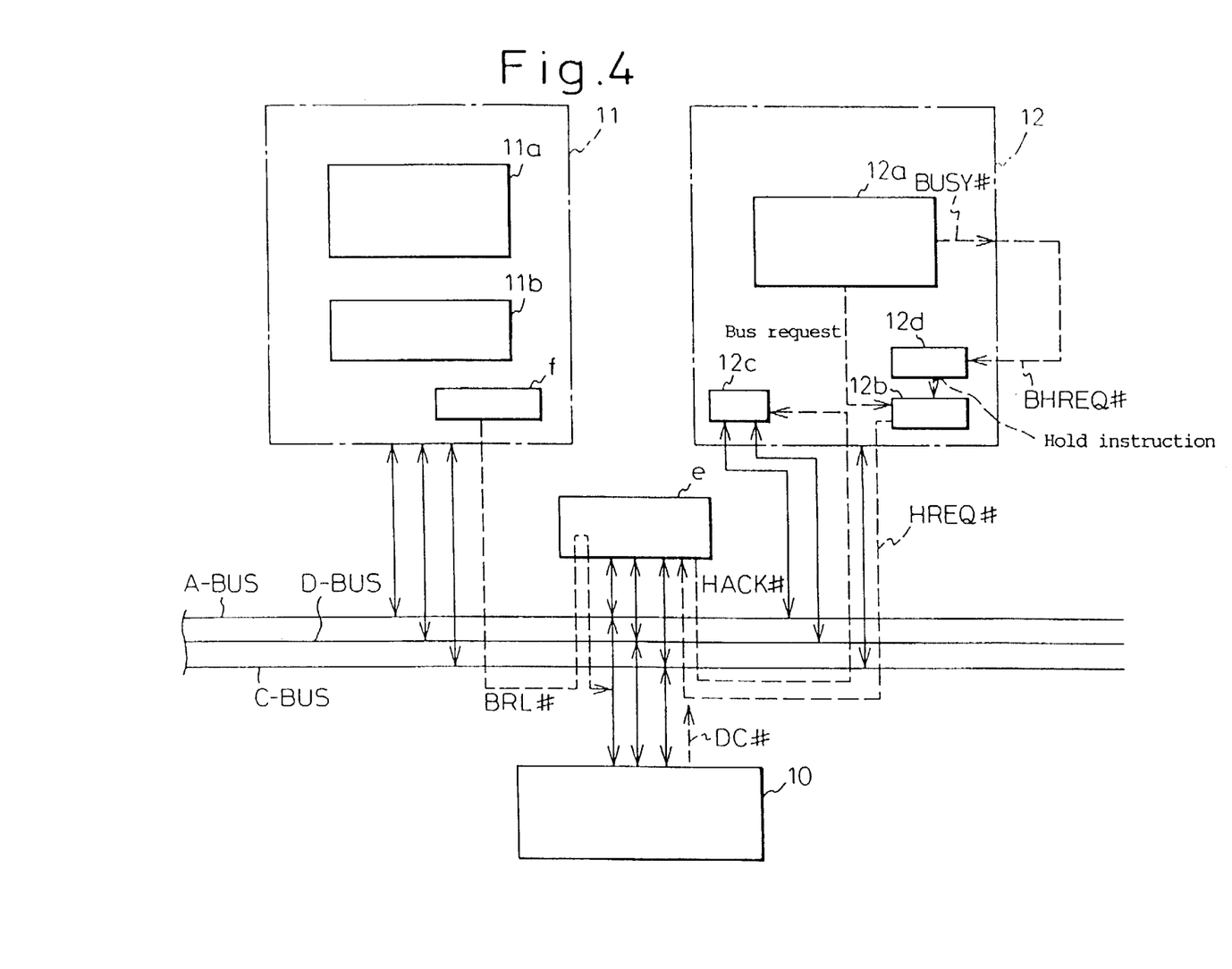
FIG. 4 is a schematic view.

FIG. 4 shows another arrangement. In FIG. 4, the bus right arbitration unit (e) is arranged independently of the processing units 11 to 1n. In this case, the processing unit 11 may be main processing unit having the release signal generation unit (f). The other processing units 12 to in may have the bus right request signal generation unit (b), bus access unit (c), and hold instruction unit (d).

Figure 3B:
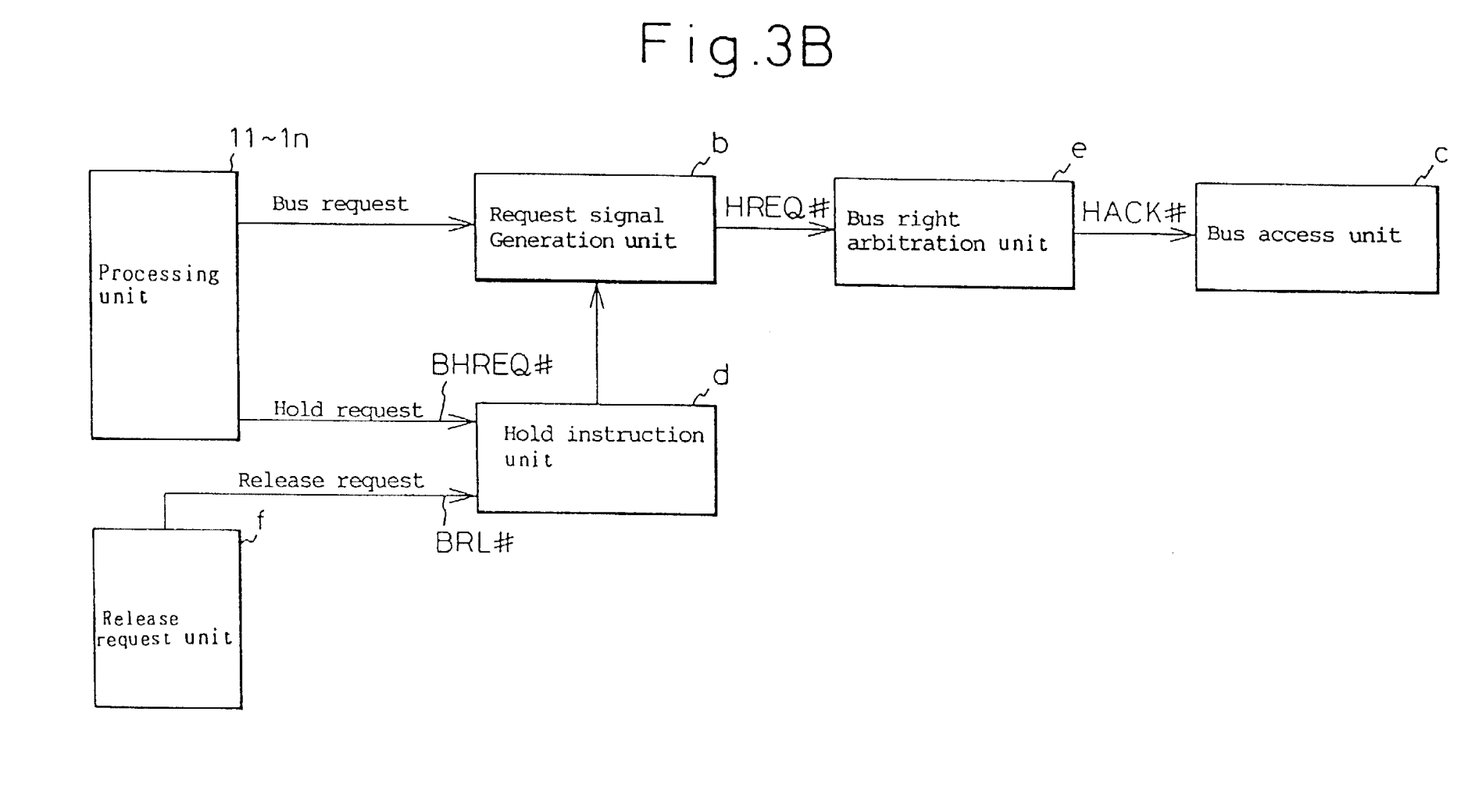

In the above two embodiments, the hold instruction unit (d) disposed in one processing unit responds to a release signal from the release signal generation unit (f) disposed in another processing unit, and releases the bus right. In the above embodiments, it is preferable to handle the release signal before the hold instruction signal. An operation of the bus controller according to the invention will be explained in detail with reference to FIGS. 3B and 4.

FIG. 4 shows the memory 10, first processing unit 11, second processing unit 12, and arbiter circuit 13, i.e., the bus right arbitration unit (e). These are connected to one another through an address bus A-BUS, a control bus C-BUS, and a data bus D-BUS.

The first processing unit 11 includes, for example, a processor (another bus request source) 11a, a cache 11b, etc. The processing unit 11 properly accesses data in the memory 10, to store the data in the cache 11b, and uses the data in the cache 11b to carry out given processes. The processing unit 11 also includes the release signal generation unit (f) for providing a bus right releasing request signal to another processing unit.

The second processing unit 12 includes a processor, or an I/O, or a coprocessor 12a (a given bus request source), request signal generation unit 12b for generating a bus request signal (HREQ#, the mark "#" indicating that the signal is active low) according to a bus request from the bus request source 12a, bus access unit 12c for accessing the buses after receiving a bus right acquisition acknowledge signal (HACK#) from the arbiter circuit e, and hold instruction unit 12d for allowing the bus request signal (HREQ#) to be continuously generated while a predetermined hold signal (BHREQ#) is being asserted and a predetermined release signal (BRL#) is being negated. Upon receiving the bus right, the bus request source 12a starts to serve as a bus master for accessing data in the memory 10.

The arbiter circuit (b) is the bus right arbitration unit that receives a bus request signal from the first and second processing units 11 and 12, and according to the signal, checks the statuses of the buses. When the buses are free, the arbiter circuit generates the bus right acquisition acknowledge signal (HACK#).

Reference mark BUSY# is a busy signal of the bus request source 12a, DC# is a memory access completion signal generated by the memory 10, and BRL# is the release signal. For example, this release signal BRL# is issued to the bus arbiter (b) according to a request of the first processing unit 11, and then the bus arbiter (e) provides the signal BRL#. When the first processing unit 11 wants to acquire the buses while the second processing unit 12 is holding the bus right, or when the first processing unit is going to forcibly release the buses, the processing unit 11 requests the arbiter (b) to assert the signal BRL#.

After receiving the release request signal, the bus right arbitration unit (e) finds the processing unit that is holding the bus right, and provides the processing unit with a release request.

Figure 5:
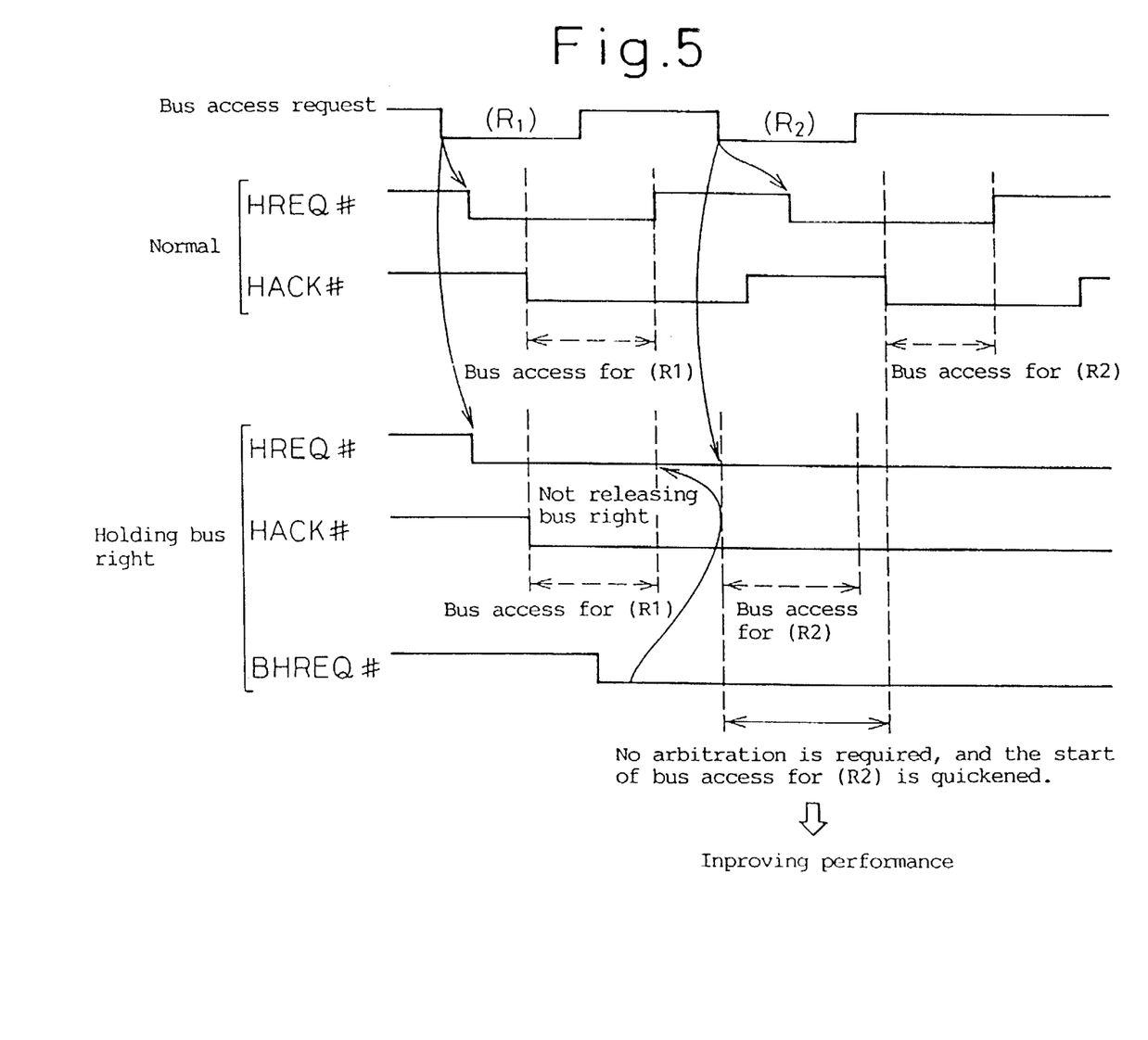
FIG. 5 is a timing chart showing a normal state and a bus right holding state.

FIG. 5 is a timing chart showing an operation of the embodiment. An upper half of the figure shows a "normal operation" with the signal BHREQ# being negated, and a lower half of the figure shows a "bus right hold operation" with the signal BHREQ# being asserted.

During the normal operation, the bus request source 12a may generate bus access requests (R1) and (R2). In response to these requests (R1) and (R2), the signal HREQ# is asserted, and after receiving the signal HACK# from the arbiter circuit (b), the bus accesses (R1) and (R2) are successively carried out.

During the normal operation, the two signals (HREQ# and HACK#) are transferred whenever the buses are accessed, so that two times of "bus arbitration" occur in this case.

On the other hand, during the bus right hold operation, the bus access (R1) is carried out, and the signal HREQ# is continuously asserted according to the signal BHREQ# to continuously hold (not release) the bus right. In this case, only one time of "bus arbitration" will do. This may quicken the start of the bus access (R2).

As a result, the intermittent bus access operations of the bus access source 12a may be carried out at high speed, improving the performance of the second processing unit 12 and the overall processing performance of the system.

If the bus right is continuously given to the second processing unit 12, the first processing unit 11 that shares the buses with the processing unit 12 cannot access the buses.

In particular, if the first processing unit 11 is a main CPU, it must immediately access the memory 10 whenever needed, or the system as a whole will be shut down.

Accordingly, the embodiment is so configured as to forcibly release the bus right held by the second processing unit 12 according to the signal BRL#.

Figure 6:
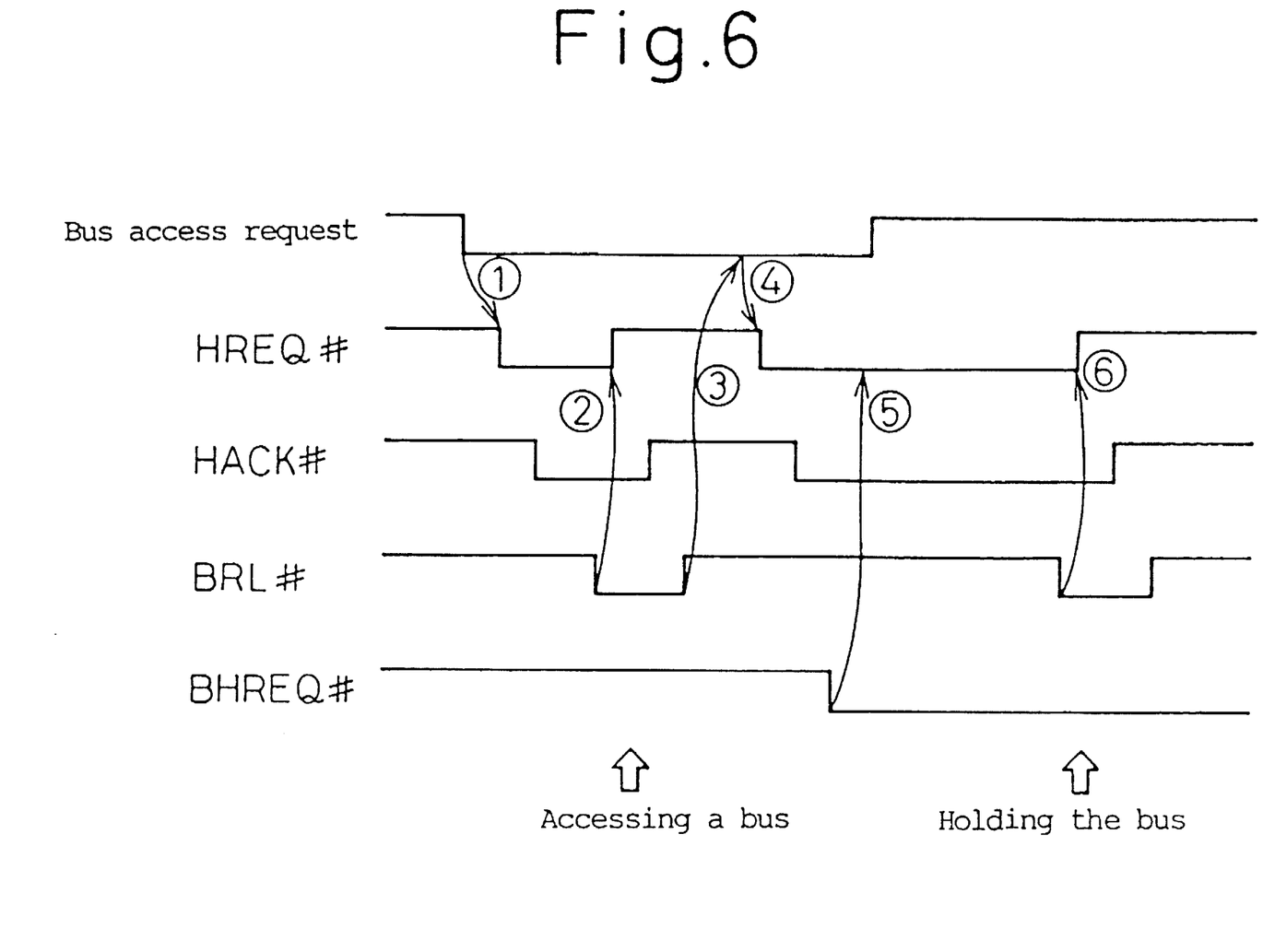
FIG. 6 is a timing chart showing a bus right releasing operation.

FIG. 6 is a timing chart showing this operation.

When a bus access request occurs with the signal BHREQ# being negated, the signal HREQ# is asserted (1). Accordingly, the bus right is secured. If the signal BRL# is asserted (2) at this moment, the signal HREQ# is negated, so that the bus right is released. If the bus request continues after the signal BRL# is negated (3), the signal HREQ# is asserted (4), so that the bus right is again acquired.

On the other hand, with the signal BHREQ# being asserted, the signal HREQ# is continuously asserted (5) even if the bus request disappears, so that the bus right may be continuously secured. If the signal BRL# is asserted (6) during this period, the bus right is forcibly released. As a result, the bus right can be smoothly shifted from the second processing unit 12 to the first processing unit 11.

As explained above, the embodiment asserts the signal HREQ# in response to a bus request of the bus request source 12a, and the bus request source 12a acquires the bus right to access the buses. When the signal BHREQ# is asserted, the signal HREQ# is continuously asserted, minimizing the number of bus arbitrations. This may improve a bus access speed and the performance of the second processing unit 12.

If the first processing unit 11 is busy, the signal BRL# is asserted, and the bus right of the second processing unit 12 is forcibly released, so that the first processing unit 11 may have the bus right.

Figure 7:
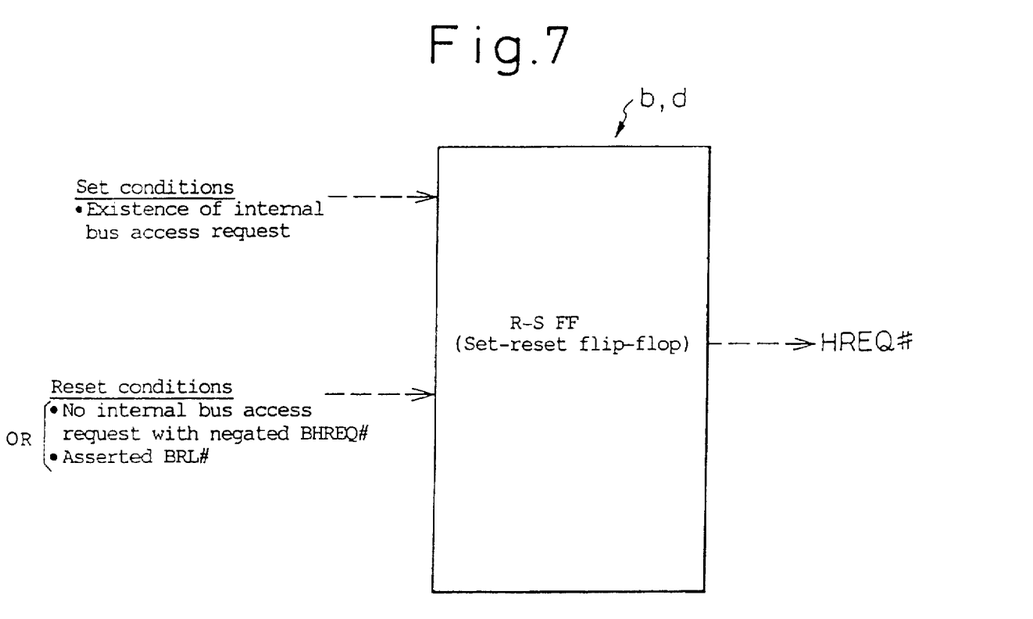
FIG. 7 is a schematic view showing an example of a request signal generation and hold unit.

As shown in FIG. 7, the request signal generation unit (b) and hold instruction units (d) may be simply realized by an R-S flip-flop.

Namely, when the bus request source 12a provides a bus request, the R-S flip-flop is set, and when there is no bus request with the signal BHREQ# being negated, or when the signal BRL# is asserted, the R-S flip-flop is reset.

According to the embodiment, the given processing unit generates the bus right hold request signal BHREQ# for holding the bus right. This signal may be produced by providing a busy signal (BUSY#) from the processor 12a of the given processing unit to the hold instruction unit (d). The signal BHREQ# may be another logical signal. For example, it may be produced by grounding.

Figure 8:
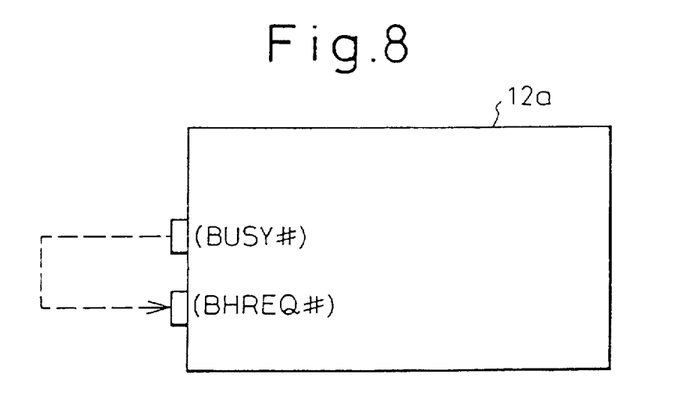
FIG. 8 is a view showing external terminals of a second processing unit.

In FIG. 8, the processor 12a accommodates the hold instruction (d), and the processor's own busy signal is used to activate the hold instruction unit (d).

An example of a bus control method employing the bus controller according to the invention mentioned above will be explained with reference to FIG. 9.

Figure 9:
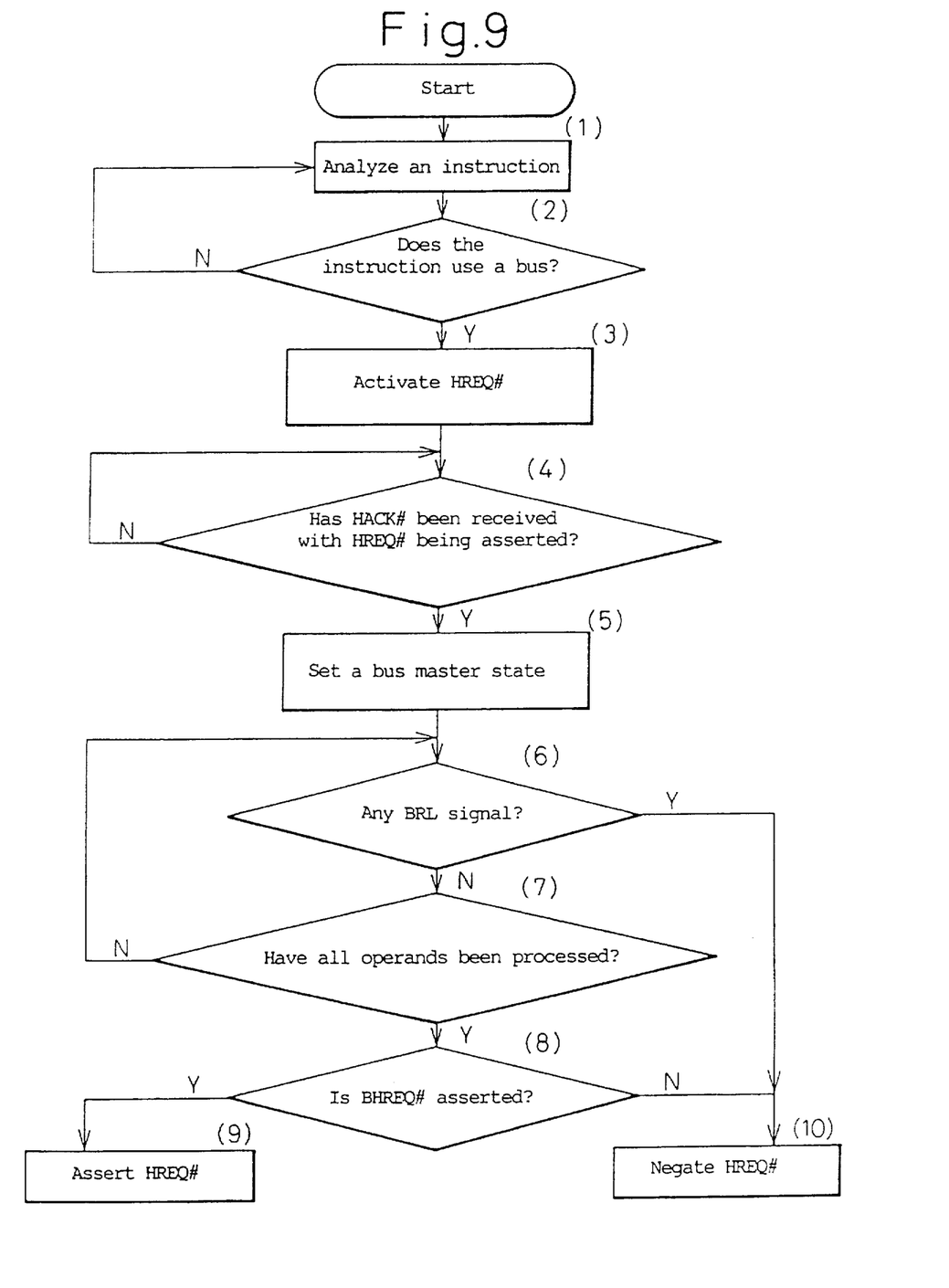
FIG. 9 is a flowchart showing operations of the invention.

FIG. 9 is a flowchart showing bus control processes carried out by the bus controller according to the invention mentioned above. After the flow starts, Step (1) analyzes an instruction, and Step (2) determines whether the instruction uses the buses.

If the instruction does not use the buses, the flow returns to Step (1) to repeat the same process. If the instruction uses the buses, Step (3) activates the bus right request signal generation unit (b) to generate the bus right request signal HREQ#.

Step (4) determines whether or not the bus right acknowledge signal HACK# is returned from the bus right arbitration unit (e) with the signal HREQ# being asserted. If the signal HACK# is not returned, Step (4) is repeated. If the signal HACK# is returned, Step (5) sets the processing unit in question as a bus master.

Step (6) determines whether another processing unit is providing a bus right release request signal, i.e., the bus release signal BRL. If there is the signal BRL, Step (10) negates the signal HREQ#.

When there is no signal BRL in Step (6), Step (7) determines whether the processing unit in question has processed all operands of the given instruction. If not, the flow returns to Step (6) to repeat the process. If the processing unit in question has completed the instruction, Step (8) determines whether the signal BHREQ# is asserted.

If the signal BHREQ# is asserted, Step (9) keeps the signal HREQ# being asserted. If the signal BHREQ# is negated, Step (10) negates the signal HREQ#.

According to the invention, the signal HREQ is kept asserted to reduce the bus access wait time. This may improve the performance of a bus request source that frequently accesses the main storage.

Unlike the prior art, which requires a processing unit to provide a bus right request whenever an instruction to be processed by the processing unit demands data that must be fetched from a memory after the bus right request is asserted, or whenever a result of the processing of the instruction is stored in the memory, the invention can secure a bus right for the processing unit until all operands are processed in the processing unit and a result of the process is stored in the memory. This may improve the processing speed.

Figure 10:
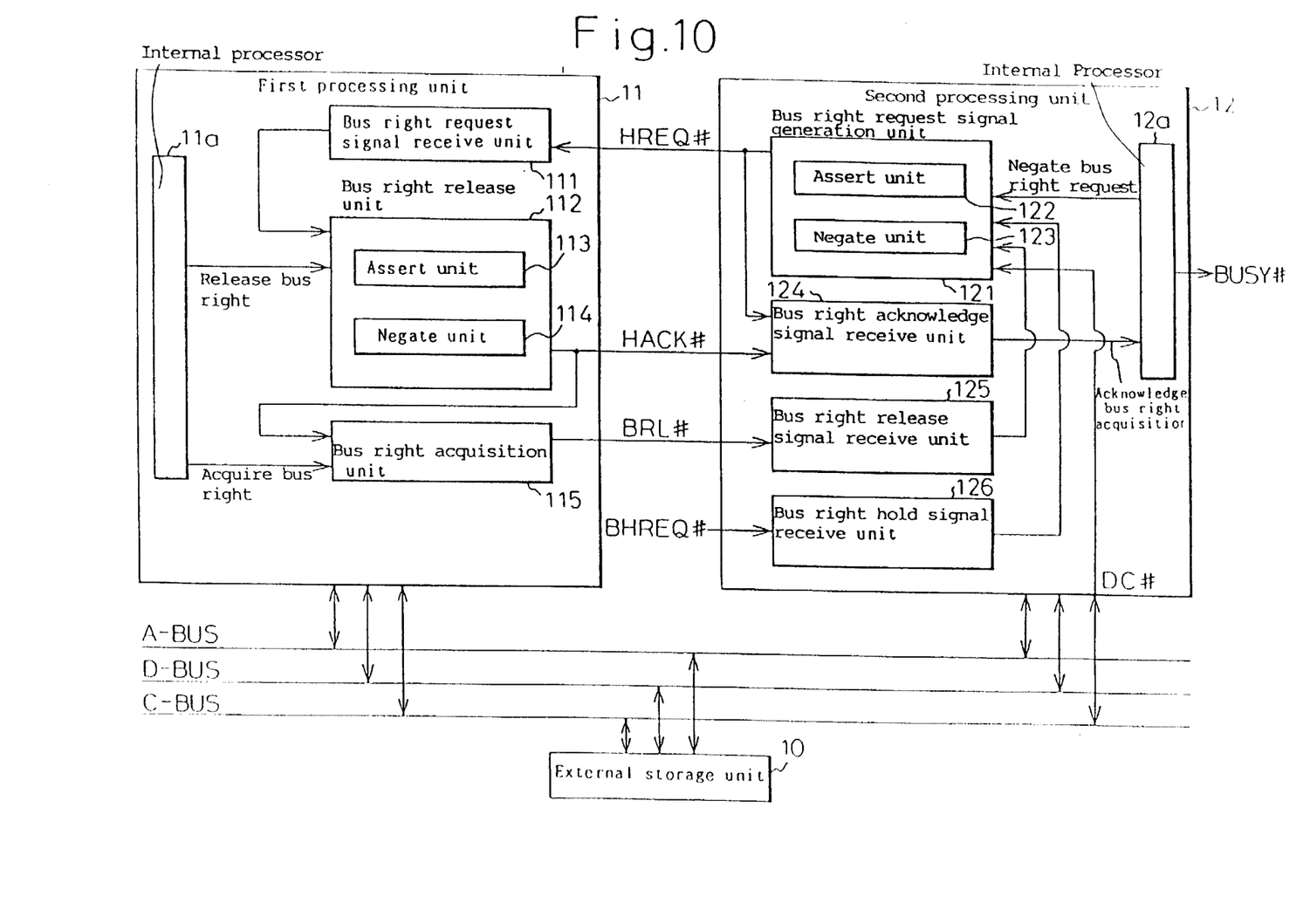
FIG. 10 is a detailed circuit diagram showing first and second processing units connected to each other without an external arbiter circuit, according to the invention.

FIG. 10 is a block diagram showing the details of internal arrangements of first and second processing units 11 and 12 of a bus control system according to the invention.

In FIG. 10, the first and second processing units 11 and 12 directly exchange a bus right request signal and a bus right release signal without using an arbiter (bus right arbitration unit).

The first processing unit 11 comprises an internal processor 11a, bus right request signal receive unit 111, bus right release unit 112 involving bus right assert units 113 and bus right negate unit 114, and bus right acquisition unit 115. The second processing unit 12 comprises an internal processor 12a, bus right request signal generation unit 121 involving bus right assert unit 122 and bus right negate unit 123, bus right response signal receive unit 124, bus right release signal receive unit 125, and bus right hold signal receive unit 126.

Figure 11:
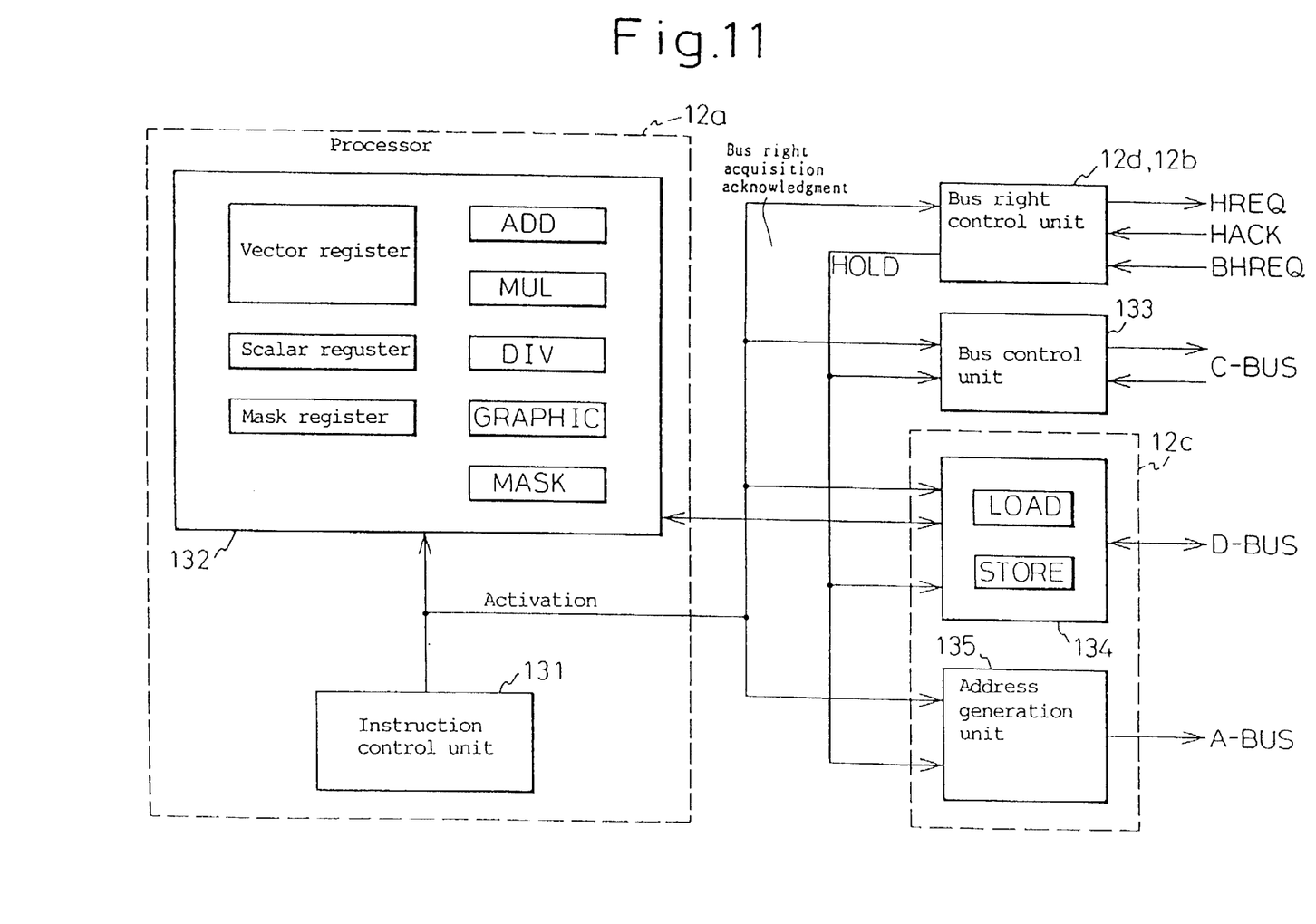
FIG. 11 is a view showing an example of a second processing unit using an external arbiter circuit, according to the invention.

FIG. 11 shows a second processing unit 12, which exchanges a bus right request signal and a bus right release signal with a first processing unit 11 through an arbiter (bus right arbitration unit).

The second processing unit 12 comprises an internal processor 12a. The internal processor 12a includes a vector register, a scalar register, a mask register, and units for providing functions of ADD, MUL, DIV, MASK, and graphics, which are driven according to instructions provided by an instruction control unit 131. Signals HREQ, HACK, BHREQ, etc., are transferred through bus right control units 12d and 12b, which are connected to a bus control unit 133. The bus control unit 133 is also connected to a control bus C-BUS. Bus access unit 12c comprises a control unit 134 and an address generation unit 135. The control unit 134 is connected to a data bus D-BUS and includes a unit for providing functions of LOAD, STORE, etc.

We claim:

1. A bus controller, used in a data processing system comprising a plurality of processing means including a first processing means and a second processing means, said second processing means currently holding a bus right therein, a bus, and storage means accessed by at least the first processing means and the second processing means, said bus controller comprising components, and said components being distributed among said plurality of processing means and comprising:

bus right request signal generation means for providing to the second processing means a bus right request signal when the first processing means requests the bus right for data communication;

bus right arbitration means, coupled to said bus right request signal generation means, for arbitrating the bus right in response to at least one bus right request signal generated from at least one of the plurality of processing means, for producing a bus right acquisition acknowledgement signal and an arbitration result, and for notifying the first processing means and the second processing means of the arbitration result;

bus access means, coupled to said bus right arbitration means, for accessing the bus by the first processing means after receiving the bus right acquisition acknowledgement signal from the bus right arbitration means;

hold instruction means, coupled to said bus right request signal generation means, for generating a hold signal for holding the bus right in the first processing means; and bus right release signal generation means, coupled to said bus right arbitration means, for generating a release signal to the first processing means, which acquired the bus right, to release the bus right, wherein each of the first and second processing means includes at least one of the components, and wherein each of said processing means holding the bus right therein releases the bus right upon receipt of said release signal and without the bus controller carrying out arbitration for the bus each time one of a data transmission and a data reception occurs.

2. A bus controller according to claim 1, wherein at least one of the plurality of processing means comprises the bus right arbitration means.

3. A bus controller according to claim 2, wherein one of the plurality of processing means comprises said bus right release signal generation means, and another of the plurality of processing means comprises the bus right request signal generation means, bus access means, and hold instruction means.

4. A bus controller according to claim 3 wherein one of the plurality of processing means is a main processing means.

5. A bus controller, used in a data processing system comprising a plurality of processing means including a first processing means and a second processing means, said second processing means currently holding a bus right therein, a bus, and storage means accessed by at least the first processing means and the second processing means, said bus controller comprising components and said components comprising:

bus right request signal generation means for providing to the second processing means a bus right request signal when the first processing means requests a bus right for data communication;

bus right arbitration means, separate from the plurality of processing means and coupled to said bus right request signal generation means, for arbitrating the bus right in response to at least one bus right request signal generated from at least one of the plurality of processing means, for producing a bus right acquisition acknowledgement signal and a bus arbitration result, and for notifying the plurality of processing means of the bus arbitration result;

bus access means, coupled to said bus right arbitration means, for accessing the bus by the first processing means after receiving the bus right acquisition acknowledgement signal from the bus right arbitration means;

hold instruction means, coupled to said bus right request signal generation means, for generating a hold signal for holding the bus right in the first processing means; and bus right release signal generation means, coupled to said bus right arbitration means, for generating a release signal to the first processing means, which acquired the bus right, to release the bus right, wherein each of the plurality of processing means includes at least one of said components selected from the bus right request signal generation means, the bus access means, the hold instruction means, and the bus right release signal generation means and wherein each of said processing means holding the bus right therein releases the bus right upon receipt of said release signal and without the bus controller carrying out arbitration for the bus each time one of a data transmission and a data reception occurs.

6. A bus controller according to claim 5, wherein one of the first processing means and the second processing means comprises the bus right release signal generation means, and other of the first processing means and the second processing means comprises the bus right request signal generation means, bus access means, and hold instruction means.

7. A bus controller according to claim 6, wherein one of the plurality of processing means is a main processing means.

8. A bus controller according to claim 7, wherein one of the plurality of processing means comprises said hold instruction means which releases the bus right in response to the release signal provided by the release signal generation means, which is provided in another of the plurality of processing means.

9. A bus controller, used in a data processing system comprising a plurality of bus request sources generating requests and interconnected by a bus, said bus controller comprising components distributed among said plurality of bus request sources, said components comprising:

request signal generation means for asserting a bus request signal according to one of the requests from one of the bus request sources;

bus right arbitration means, coupled to said request signal generation means, for arbitrating a bus right, determining to which bus request source the bus right is given according to the bus request source that initiated the bus request signal, informing the bus request sources of the result of the arbitration, generating a bus right acquisition acknowledgement, and asserting a predetermined release signal;

a bus master comprising one of the bus request sources receiving the bus right and asserting a predetermined hold signal;

bus access means, coupled to said bus right arbitration means, for performing access to a bus for the bus request source as the bus master, after receiving the bus right acquisition acknowledgement from said bus right arbitration means; and hold instruction means, coupled to said request signal generation means and to said bus master, for allowing the bus master to continuously access the bus by asserting the bus request signal while the predetermined hold signal is being asserted and without the predetermined release signal being asserted, wherein each of said processing means holding the bus right therein releases the bus right upon receipt of said predetermined release signal and without the bus controller carrying out arbitration for the bus each time one of a data transmission and a data reception occurs.

10. A bus controller according to claim 9, wherein the predetermined hold signal is asserted when the bus request source asserts at least one request for the bus right.

11. A bus controller according to claim 9, further comprising a bus right release signal generation means for generating the predetermined release signal to a current bus request source of the bus request sources, which is holding the bus right, to release the bus right, wherein the predetermined release signal is asserted by said bus right release signal generation means to release the bus right from the current bus request source when a bus request source different from, but sharing the bus with, the current bus request source requests the bus right and requests to serve as the bus master.

12. A bus controller which is used in a data processing system comprising a plurality of processing means including a first processing means generating a bus request signal and a hold request signal, and a second processing means generating a bus request signal and a bus release request signal, a bus connected to the plurality of processing means, and a storage means accessed by the plurality of processing means, said bus controller distributed among the plurality of processing means and comprising:

hold request signal generating means, located in the first processing means, for generating the hold request signal when the first processing means has control of the bus and the first processing means requires intermittently a bus right;

bus right release generating means, located in the second processing means, for generating a bus release request signal when the first processing means has control of the bus and the second processing means requires control of the bus; and arbitration means for determining which processing means gains control of the bus, said hold request signal enabling the first processing means to maintain control of the bus and said bus release request signal enabling the second processing means to gain control of the bus by releasing the hold request signal of the first processing means, wherein each of said processing means holding the bus right therein releases the bus right upon receipt of said bus release request signal and without the bus controller carrying out arbitration for the bus each time one of a data transmission and a data reception occurs.

13. A data processing device coupled to another device through a bus and comprising:

a bus-interface coupled to the bus;

a processor for processing data and coupled to the bus-interface, said processor communicating with the another device through the bus-interface; and a bus right control circuit, operatively coupled to the processor and the bus-interface, supplying a bus request signal to the another device and receiving an acknowledged signal, a bus hold request signal, and a bus release signal, wherein the bus right control circuit holds a bus right for a plurality of bus requests without releasing the bus right after the acknowledged signal is received in response to the bus request signal if the bus hold request signal is asserted, and the bus right control circuit releases the bus right if the bus release signal is asserted regardless of whether the bus hold request signal is asserted, and without the bus right control circuit carrying out arbitration for the bus each time one of a data transmission and a data reception occurs.

* * * * *

UNITED STATES PATENT AND TRADEMARK OFFICE
CERTIFICATE OF CORRECTION

PATENT NO. : 5,526,494
DATED : June 11, 1996
INVENTOR(S) : Hideyuki IINO et al.

It is certified that error appears in the above-indentified patent and that said Letters Patent is hereby corrected as shown below:

Col. 1, line 9, change "operation" to --operating--;
line 10, change "includes" to --include--;
line 11, after "interface" insert --,--;
line 46, change "Et" to --Σt--.

Col. 3, line 47, change "in" to --1n--.

Col. 4, line 5, change "in" to --1n--.

Col. 6, line 9, after "instruction" insert --unit--;
line 24, delete "or not".

Signed and Sealed this

Twenty-fifth Day of March, 1997

Attest:

BRUCE LEHMAN

Attesting Officer

Commissioner of Patents and Trademarks